(No Model.) 2 Sheets—Sheet 1.

A. WAHLIN.
CENTRIFUGAL BUTTER EXTRACTOR.

No. 491,501. Patented Feb. 7, 1893.

Witnesses:
J. Staib
Chas. H. Smith

Inventor:
Adolph Wahlin
per Lemuel W. Serrell atty (No Model.) 2 Sheets—Sheet 2.
A. WAHLIN.
CENTRIFUGAL BUTTER EXTRACTOR.
No. 491,501. Patented Feb. 7, 1893.
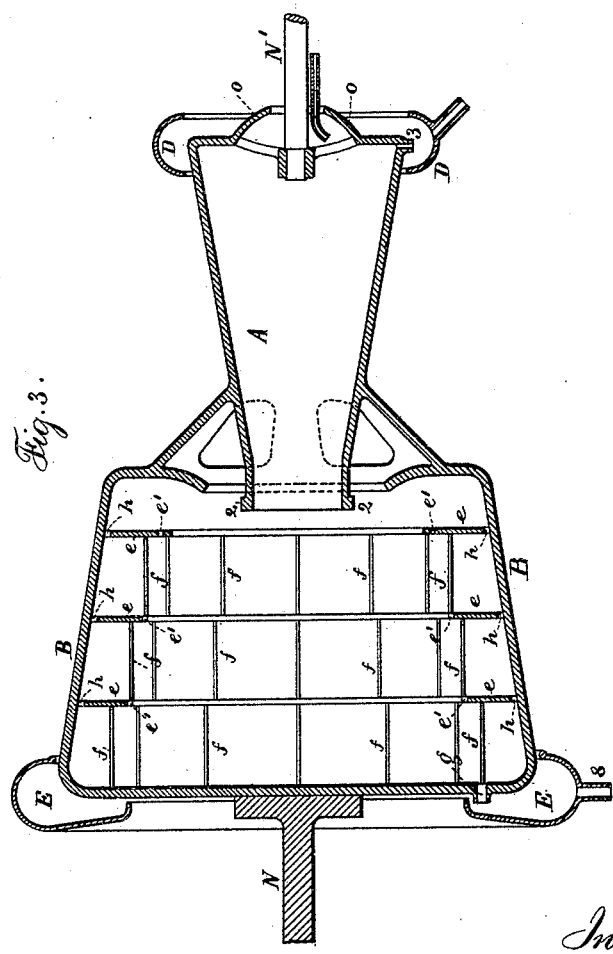
Fig. 3.
Witnesses:
J. Staib
Chas H Smith
Inventor:
Adolph Wahlin
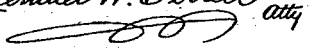
per Lemuel W. Serrell atty
THE NORRIS PETERS CO., PHOTO-LITHO., WASHINGTON, D. C.

UNITED STATES PATENT OFFICE.

ADOLPH WAHLIN, OF STOCKHOLM, SWEDEN, ASSIGNOR TO R. DUNCAN HARRIS, OF NEW YORK, N. Y.

CENTRIFUGAL BUTTER-EXTRACTOR.

SPECIFICATION forming part of Letters Patent No. 491,501, dated February 7, 1893.

Application filed November 30, 1889. Serial No. 332,103. (No model.)

*To all whom it may concern:*

Be it known that I, ADOLPH WAHLIN, a subject of the King of Sweden and Norway, residing at Stockholm, Sweden, have invented an Improvement in Centrifugal Butter-Extractors, of which the following is a specification.

The object of this invention is to separate the butter direct from the sweet milk before the same has become injured by atmospheric influences so that the butter milk may remain in a sweet condition and the butter cells are not broken and injured in the manner common in ordinary churns and in centrifugal separators that have heretofore been made in which the milk and cream are exposed to violent agitation.

In all centrifugal separators the most powerful effect is produced in that part of the apparatus the farthest away from the center of rotation. I avail of this in my butter extractor, and separate the cream from skim milk in the central portion of the centrifugal extractor, and the cream is passed to the exterior of the extractor and subjected to the more powerful action thereof in gradually driving the butter-milk away from the particles of butter, the operation being progressive toward the portion of the apparatus that is largest in diameter, at which point the buttermilk and the fat or buttery particles are discharged in a separated condition, the apparatus is arranged in such a manner that the fresh milk can be supplied progressively and continuously and the butter be discharged in a similar manner. I am also able to draw off from the apparatus, cream that is separated from the skim milk, such cream being contained in a stationary vessel as it is discharged from the cream separator and before it passes into the butter separator.

Figure 1:
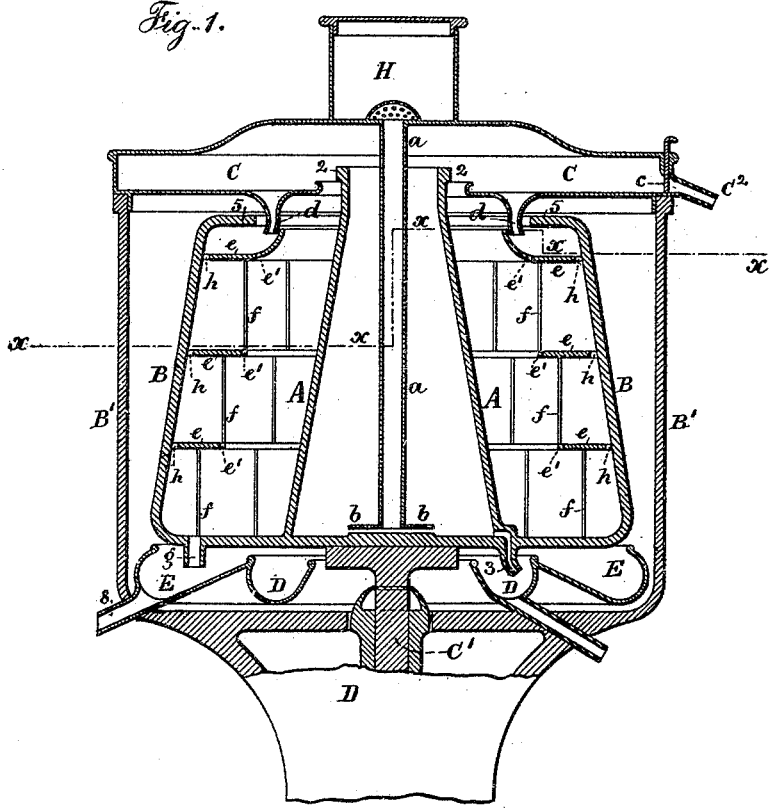
Figure 2:
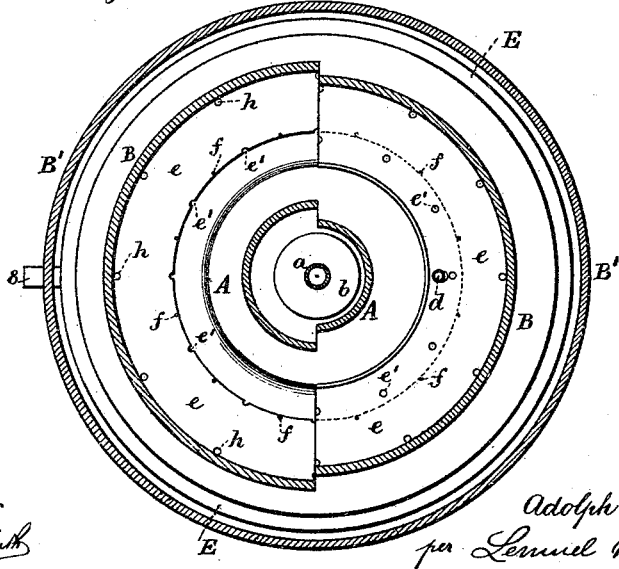

In the drawings, I have represented in Fig. 1 a vertical section of the apparatus and in Fig. 2 a sectional plan on the line $x$ $x$ of Fig. 1 and in Fig. 3 a modification of the apparatus.

The vertical shaft $C'$ is rotated by any suitable power, and is supported in the base D in any desired or convenient manner, the centrifugal separator being upon the upper end of the shaft and revolving with the same.

The main portion B of the separator is slightly conical, and in it the butter is separated as hereinafter described. Within the main separator B is the cream separator A which is frusto conical and which is provided with a central supply pipe $a$ to which the sweet or fresh milk is supplied in any suitable manner. At the bottom end of this pipe $a$ is the spreading disk $b$ between which and the bottom of the separator the milk passes. The cream accumulates around the inner surface of the frusto conical separator A until it flows over and is discharged from the top edge 2 of such separator, and the skim milk by its greater specific gravity and by the centrifugal action passes along the conical surface of the separator A and is discharged from the small outlet 3 into the annular receiver D from which it runs by a suitable pipe.

The cream holder C is stationary, and is supported by the case B' surrounding the separator. In the bottom of this cream holder is a circular opening through which the upper end of the centrifugal cream separator A passes, in order that the cream thrown off by the centrifugal force may be received into this cream holder C. A spout $C^2$ and a valve or gate at $c$ are provided to regulate the discharge of the cream from the holder, hence more or less of the cream that is separated by the centrifugal separator A may be drawn off, or the whole of it may be used in making butter as hereinafter described.

I have shown upon the top of the cream holder C a milk holder H through the bottom of which the pipe $a$ opens. A perforated cover is placed over the pipe $a$. The fresh milk is supplied into the holder H in the usual manner and passes down through such pipe $a$ into the cream separator A, and from the cream holder C the cream passes down by gravity through the tubes $d$ into the butter separator B. As before mentioned, this butter separator B is conical, and its upper end is contracted by an annular flange 5 so as to retain the cream as it passes down through the tubes $d$, and within the butter separator B are annular shelves $e$, there being any desired number of such shelves. I have shown three of them, and each shelf has one or more openings $h$ adjacent to the interior surface of the conical separator, and also by preference one or more holes $e'$ or notches at or near the inner edge of each shelf. At the bottom of the butter separator is an escape or delivery tube $g$ from which the butter and the butter milk pass gradually and are thrown off into the annular receiver E which is around the base of the butter separator, and is preferably constructed so that the particles of butter can be easily removed therefrom, the butter-milk running away by an opening or spout S. It will now be apparent that the particles of butter being the lightest will be displaced by the butter milk, the latter passing outwardly and intervening between the particles of butter and the interior of the conical sides of the separator B and the openings $h$ are of a size to cause the proper proportional delivery of the buttermilk through the respective shelves from one section to the next, and as the particles of butter pass from one shelf to the other the centrifugal force causes the butter-milk to pass outwardly away from the particles of butter, so that the butter-milk intervening between the metal and the buttery particles prevents the latter adhering, and such buttery particles aggregate or adhere together more or less and pass away, and the butter-milk runs from the particles of butter as the two are discharged through the opening $g$.

If there are openings at $e'$ the buttery particles will pass through the same, or if there are notches at the edges of the shelves the buttery particles will flow through them, as such particles accumulate, otherwise these particles will flow over the inner edges of the shelves as they pass from one section of the butter separator to the other. With centrifugal separators, the vessel itself moves somewhat faster than the liquid or semi liquid contents thereof. I make use of this condition to effect a slight stirring operation in the cream to aid in opening up the mass for the particles of butter-milk to be driven outwardly and away from the buttery particles by the centrifugal action. This object is accomplished by the ranges of wires $f$ that are parallel or nearly so to the axis of rotation of the separator and lie within the respective layers of buttery particles, in line or nearly so with the delivery holes or edges so as to produce an agitation in the layer of buttery particles.

Instead of continuous wires from one shelf to the next such wires may be in the form of studs or pins or teeth of greater or less length.

In cases where a stationary cream holder is not required, and the whole of the cream is to pass into the butter separator, the apparatus may be arranged as shown in Fig. 3 the operation of each part being the same as before described but the cream being delivered into the upper or smaller end of the butter separator, and when the separator is placed horizontally instead of vertically a supporting shaft is usually required at both ends as seen at N N', in which case the milk is supplied into the annular trough $o$ in a manner similar to that employed in ordinary horizontal cream separators. The operations of the respective parts are the same when the machine is horizontal as when it is vertical.

In cases where the holes $h$ are closed, or not provided, the butter-milk will accumulate in the annular spaces until it flows over the edges of the shelves, the butter particles will be upon the surface of such butter-milk and pass along progressively to the place of delivery.

It will be understood that the butter-milk remains sweet and is in a better condition for use than it is after the ordinary souring operation incident to the usual manner of making butter, and by the present improvements a saving of time is effected in the separation of the butter and in the room and number of vessels required in the dairy, as it is not necessary to make use of cream vats, churns or coolers, and considerable saving is effected in the running expenses connected with the production of the butter and by the separation of the butter mechanically and from the sweet milk and by comparatively unskilled attendants, the dairy business is rendered more reliable and less dependent upon skilled labor and the different products from the milk, such as skim-milk, buttermilk, and butter, are preserved in the best condition for subsequent use, because the cream is not exposed to any whipping action, violent agitation or unnecessary exposure to the oxidizing influences of the atmosphere.

In centrifugal butter extractors heretofore made use of, the violent agitation to which the cream is exposed tends to mix the buttery particles with the butter-milk, similar to the production of an emulsion. This is entirely prevented by my improvements, and any butter-milk remaining in the butter, after it is taken from the trough F can be easily removed by an ordinary butter worker.

In consequence of the cream and buttery particles passing along over a series of annular ledges or shelves and proceeding from a smaller diameter to a larger diameter, the cream and buttery particles are exposed to two peculiar actions. The cream and buttery particles form annular rings of successively increasing diameter, and during the separating operation the respective rings are exposed to the severe centrifugal action that tends to cause the buttery particles to adhere to each other, and at the same time the skim-milk being heavier is thrown outwardly between respective ledges or shelves, and as the cream is added at one end of the butter separator, the accumulation is sufficient to force a portion of the buttery particles over the edge of one shelf or ledge into the next one, and in so doing there is more adhesion between the ledge or shelf and the buttery particles than there is between the skim milk and such ledge or shelf, and the skim milk is thrown outwardly by the centrifugal action and the buttery particles are delivered upon the surfaces of the next annular ring of buttery particles; and this operation continues as the materials are crowded over one edge or ledge into the next receptacle, and the granules or lumps of butter increase in size, so that when they are delivered from the centrifugal apparatus, they can easily be collected within a sieve and separated from the skim milk and only require to be treated in the usual manner by a butter worker. The edges of the shelves or ledges form the surfaces over which the watery portions are spread in such a thin layer that the butter globules are thereby separated and caused to adhere or coalesce.

I claim as my invention:—

1. The combination with a centrifugal cream separator, of a butter separator connected to and revolving with the cream separator and having a series of annular shelves or ledges for retaining the cream and causing the buttery particles to adhere together by the centrifugal action and by such buttery particles passing in succession over the edges of the shelves or ledges, substantially as set forth.

2. The combination with two separating vessels rotating together, of the supply pipe for milk passing into the first separating vessel, a series of shelves or ledges in the second vessel, there being a passage from the first vessel into the second vessel for the cream and a delivery opening for the buttery particles and butter milk from the larger end of the second vessel, substantially as set forth.

3. A centrifugal butter separator having a series of annular ledges or shelves, increasing in diameter from the supply end of the separator and a delivery opening at the larger end of the separator for the discharge of the buttery particles and butter milk, the buttery particles being caused to adhere together as they are forced by the centrifugal action to pass over the edges of the annular shelves in succession, substantially as set forth.

4. The combination with a centrifugal separator, of a butter separator, connected with the centrifugal separator at or near the cream discharge, such butter separator having a series of annular ledges, increasing in diameter outwardly for the retention and progressive discharge over the edges of the ledges of the buttery particles and skim milk, substantially as set forth.

5. The combination in a centrifugal butter separating apparatus, of a cream supplying device, ledges or surfaces over which the watery particles are caused to pass by the centrifugal action and upon which the buttery globules accumulate and coalesce, and a delivery for the watery and buttery materials substantially as specified.

6. The combination with a centrifugal cream separator of a butter separator receiving the cream from the cream separator, ledges or surfaces over which the watery particles are caused to pass by the centrifugal action and upon which the buttery globules accumulate and coalesce, and a delivery for the watery and buttery materials substantially as specified.

7. The method herein specified of separating the buttery globules from the watery substances in milk or cream, consisting in supplying the materials in a regulated quantity and subjecting the same to a centrifugal action, and causing the materials to progress regularly through the apparatus and spread in a very thin layer by the centrifugal action as such materials pass from one part or surface to another in order that the watery portions may be thrown off in a thin layer and caused to separate from the buttery portions and the latter to accumulate and coalesce substantially as specified.

Signed by me this 27th day of November, 1889.

ADOLPH WAHLIN.

Witnesses:
GEO. T. PINCKNEY,
WILLIAM G. MOTT.